United States Patent
Priepke et al.

(10) Patent No.: US 9,371,187 B2
(45) Date of Patent: Jun. 21, 2016

(54) SUPERCHARGING FEED SYSTEM AND METHOD FOR A BELT IN TUBE CONVEYOR

(71) Applicant: CNH America LLC, New Holland, PA (US)

(72) Inventors: Edward H. Priepke, Lancaster, PA (US); Scott D. Wilson, Denver, PA (US); John J. Borsdorf, Leola, PA (US); Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 29 days.

(21) Appl. No.: 13/949,596

(22) Filed: Jul. 24, 2013

(65) Prior Publication Data

US 2015/0027854 A1 Jan. 29, 2015

(51) Int. Cl.
*B65G 47/00* (2006.01)
*B65G 15/08* (2006.01)
*A01D 41/12* (2006.01)

(52) U.S. Cl.
CPC ............ *B65G 15/08* (2013.01); *A01D 41/1217* (2013.01)

(58) Field of Classification Search
CPC .................................. A01D 61/02; B65G 15/08
USPC ........... 198/823, 606, 607, 640, 641; 460/114
See application file for complete search history.

(56) References Cited

U.S. PATENT DOCUMENTS

| | | | |
|---|---|---|---|
| 2,007,910 A | 7/1935 | Stephens | |
| 2,978,095 A | 4/1961 | Jenike | |
| 3,268,060 A | 8/1966 | Long | |
| 3,429,422 A * | 2/1969 | Yoshimura | 198/699.1 |
| 3,438,584 A | 4/1969 | Klein | |
| 3,586,156 A | 6/1971 | Easley, Jr. | |
| 3,647,049 A | 3/1972 | Hartzell, Jr. | |
| 3,889,802 A | 6/1975 | Jonkers | |
| 4,646,910 A * | 3/1987 | Johanson et al. | 198/535 |
| 4,681,214 A | 7/1987 | Karpisek | |
| 4,760,913 A | 8/1988 | Tschantz | |
| 4,800,902 A | 1/1989 | Maust | |
| 5,343,761 A * | 9/1994 | Myers | 73/861.73 |
| 5,351,558 A * | 10/1994 | Horn et al. | 73/861.08 |
| 5,369,603 A * | 11/1994 | Myers | 702/86 |
| 5,496,215 A * | 3/1996 | Underwood et al. | 460/114 |
| 5,509,854 A | 4/1996 | Underwood | |

(Continued)

FOREIGN PATENT DOCUMENTS

| | | |
|---|---|---|
| DE | 2100956 | 1/1971 |
| DE | 4217209 | 5/1991 |

(Continued)

*Primary Examiner* — William R Harp

(74) *Attorney, Agent, or Firm* — Patrick M. Sheldrake

(57) ABSTRACT

A system and method for supercharging the feed system for a belt in tube conveyor for agricultural products, which enables achieving a full or near full fill level of the conveyor belt entering the intake end of the conveyor tube. The invention uses a crop delivery apparatus operable to propel an airborne flow of the crop material at least largely in a direction of movement of the conveyor belt, onto the belt surface after formation into a concave shape conforming to a lower portion of the conveyor tube. Additional capabilities include the ability to propel the crop material into an intake end of the conveyor tube, and provision of enclosing structure for containing and focusing the crop material flow. The system can accommodate various angles of tilt and sideward pivotal movement of the conveyor.

18 Claims, 8 Drawing Sheets

(56) References Cited

U.S. PATENT DOCUMENTS

| | | | |
|---|---|---|---|
| 5,560,246 A * | 10/1996 | Bottinger et al. | 73/861.15 |
| 5,686,671 A * | 11/1997 | Nelson et al. | 73/861.73 |
| 5,750,877 A * | 5/1998 | Behnke et al. | 73/1.33 |
| 5,857,907 A | 1/1999 | Underwood | |
| 5,863,247 A * | 1/1999 | Behnke et al. | 460/6 |
| 5,890,961 A | 4/1999 | Behnke et al. | |
| 6,012,272 A * | 1/2000 | Dillon | 56/14.6 |
| 6,125,618 A | 10/2000 | Dillon | |
| 6,135,171 A * | 10/2000 | Weakly et al. | 141/286 |
| 6,155,407 A | 12/2000 | Shelstad | |
| 6,170,644 B1 * | 1/2001 | Nakaegawa et al. | 198/811 |
| 6,293,389 B1 | 9/2001 | Knapp et al. | |
| 6,339,917 B1 * | 1/2002 | Dillon et al. | 56/14.6 |
| 6,350,197 B1 | 2/2002 | Cooksey et al. | |
| 6,360,878 B1 * | 3/2002 | Deal et al. | 198/819 |
| 7,000,758 B2 | 2/2006 | Björklund | |
| 7,325,673 B2 | 2/2008 | Kotaki et al. | |
| 7,654,387 B2 | 2/2010 | Armstrong | |
| 8,186,497 B2 | 5/2012 | Mackin et al. | |
| 8,241,098 B1 * | 8/2012 | Latimer | 460/114 |
| 8,616,364 B2 | 12/2013 | Priepke | |

FOREIGN PATENT DOCUMENTS

| | | |
|---|---|---|
| FR | 2715388 | 7/1995 |
| JP | 5292831 | 11/1993 |

* cited by examiner

SUPERCHARGING FEED SYSTEM AND METHOD FOR A BELT IN TUBE CONVEYOR

TECHNICAL FIELD

The present invention relates to automated conveying systems, and more particularly to a system and method for supercharging a belt in tube conveyor for agricultural products, to enable achieving a full or increased fill level of the belt entering the intake end of the conveyor tube. The supercharging is achieved by propelling the crop material onto the conveyor belt or the material previously deposited on the belt, substantially, or at least largely, in a direction of movement of the belt, and after the belt has been at least substantially transitioned into a concave shape for passage through the tube, such that significant directional change or movement in a direction other than the direction of movement of the belt, are avoided.

BACKGROUND ART

To increase productivity, agricultural vehicles, such as combines, are becoming larger, headers are becoming wider, and travel speeds are increasing during harvest. Additionally, harvesting operations in a large field often involve simultaneous harvesting and unloading of harvested crop material. Typically, the combine has an unloading system including an unloading tube containing a helical auger, that is deployed for unloading crop material from an on board grain tank into an accompanying receiving container, such as a tractor pulled cart, wagon, truck, trailer, or the like. However, this manner of unloading has been found to be slower than desired for many agricultural operations. Also, as a consequence of necessary spacing between the auger flight edges and the interior surface of the unloading tube, the crop material can be damaged therebetween.

Belt conveyors have found to be an advantageous alternative to auger type conveyors for several reasons. For instance, the belts are lighter, less costly, and may be operated at faster speeds than augers and thus have higher potential capacity. Belt conveyors can also deliver the crop material in a more continuous manner with less vibration. In general, it has been found that conveying crop material using belts results in less crop damage than augers.

As a result, for some agricultural applications, it is desired to replace auger conveyors with belt conveyors. Particularly for unloading conveyors of agricultural harvesters, wherein the unloading often occurs while the harvester is moving, including over uneven terrain and while on slopes and hills, under windy and other adverse weather conditions, it is desired to utilize covered conveyors, such as belt in tube conveyors. In a belt in tube conveyor, the belt runs through an elongate tube, typically having a lower peripheral portion of round or curved sectional shape, and the belt conforms to the lower periphery of the tube, so that an upwardly concave, typically curved shape, is imparted to the belt, particularly an upwardly facing material carrying feed surface thereof. The belt then typically returns externally along the underside of the tube. Generally, the ends of the belt encircle cylindrical rollers, such that the ends of the belt adjacent and about the rollers are flat and wider than a sideward extent or diameter of the unloading tube. Before or as the belt enters the tube, it is gradually transitioned in some manner from the flat shape to conform to the concave, e.g., curved or rounded, shape of the lower portion of the tube.

In use, belt in tube conveyors are typically fed from a hopper, bin or other container, and the only force acting on the material is gravity, so that the material is only propelled downwardly, although it may fan out or be directed laterally by a spout or chute. The downwardly flowing material can be accelerated by gravity to a significant downward velocity, and is typically deposited on a belt moving horizontally or at an upward incline, so both the direction of movement of the material will have to be changed, possibly significantly (e.g., from directly downward to an upward incline), and energy imparted to the material by its downward movement will have to be dissipated and/or redirected in some manner. The material is typically deposited onto the flat region of the belt or partially onto the transition region outside of the tube where the belt is formed into the concave shape. As the belt is transitioned to the concave shape while carrying material, some of the material will be lifted and shifted laterally toward the center of the belt, possibly while additional material is deposited onto it, such that turbulence can occur that will impede movement and acceleration of the material to the belt speed, which can decrease the effective capacity of the conveyor and conveying speed.

It has also been observed that the belt's fill level is reduced as the speed of the belt increases and the incline of the conveyor increases. For example, some known commercially available portable belt conveyors operate at belt speeds of about 600 feet per minute, and at inclines of 15 to 30 degrees. These are within the anticipated ranges of speeds and inclines desired for unloading application for agricultural vehicles, particularly harvesters. Experience with these conveyors in conveying common grains is that the belt is less than full at these conditions, with a general rule that the fill decreases as the incline increases, largely for the reasons just explained. As a result, use of belt in tube conveyors for unloading applications has been found to suffer from shortcomings in terms of speed and/or capacity.

Thus, what is sought is a manner of increasing the fill of a belt in tube conveyor system for agricultural products to take advantage of the potential speed of operation and other benefits thereof, particularly for use as an unloading conveyor for a machine or vehicle such as a harvester, and which overcomes one or more of the shortcomings and limitations, set forth above.

SUMMARY OF THE INVENTION

What is disclosed is a supercharging feed system and method for a belt in tube conveyor, that adapts the conveyor for use for unloading, particularly, an agricultural vehicle such as but not limited to, a harvester, so as to provide one or more of the capabilities and advantages, and overcome one or more of the shortcomings and limitations, set forth above.

According to a preferred aspect of the system and method of the invention, the belt in tube conveyor or associated structure includes a transition portion or region associated with an intake end of the conveyor tube. The transition portion or region has a sectional shape that tapers or gradually changes to transition the belt from a flat shape as it comes off of a roller or other rotary end element of the conveyor, to an upwardly open curved concave shape of the lower portion of the conveyor tube that bounds an intake end of the tube and a passage therethrough, and which supports the belt therein, such that as the belt moves over the transition portion at a belt velocity or speed, and into or toward the intake end of the tube, it is transitioned into the concave shape of the lower portion of the tube wherein the sides of the belt will extend upwardly about the inner lower periphery of the conveyor tube, moving at the belt speed and bounding the sides of a crop receiving channel or cavity through the tube.

According to another preferred aspect of the invention, the system includes a crop delivery apparatus configured and disposed to propel a substantial portion of the crop material at a crop velocity substantially, or at least largely in the feed direction, so as to be directed into the crop receiving cavity and deposited at least substantially or largely onto the concave portion of the belt or the existing crop material on the concave portion. As a non-limiting example, for a belt in tube conveyor that is horizontal or oriented at a small inclined angle upwardly toward the outlet end, the crop delivery apparatus can be configured to propel the crop material horizontally, or at a similar incline to horizontal, either upwardly or downwardly. As a result, the crop material is not required to significantly change direction when deposited on the belt or material on the belt, as it is already moving at least largely in the feed direction of the belt, and the belt is already substantially or at least largely in the concave shape, such that little or no shifting or other extraneous movement of the material occurs, as would be the case using essentially just gravity feed or a spout to feed the material onto the belt, and onto the belt while still largely flat or still transitioning into the concave shape of the lower portion of the conveyor tube. Contact with stationary side wall and other enclosing structure is also avoided, which can further disrupt and impede crop material flow. The crop material flow can be further focused using additional structure above the belt, including above the concave portion. This can be advantageous, as it allows the belt in tube conveyor to be rotated or pivoted sidewardly about the intake end, relative to the crop delivery apparatus. As a non-limiting example, about a 30 degree range of sideward movement can be allowed, while still providing desired fill capabilities, to enable varying a position of a discharge end of the conveyor relative to a receiving container such as a truck or wagon, in the manner of known unloading conveyors, for distributing the unloaded crop material within the receiving container.

Suitable preferred crop delivery apparatus for use in the invention can include a centrifugal discharge elevator, such as, but not limited to, a centrifugal discharge paddle or a bucket elevator, or a belt conveyor, configured and oriented to mechanically propel the crop material in a suitable airborne manner, substantially, or at least largely, in the feed direction, and with sufficient velocity to pass over the end roller and transition portions of the conveyor belt, so as to enter the crop receiving cavity bounded by the concave shape of the belt and land at least largely or mostly on that portion, as opposed to on the flat or still transitioning portion. The centrifugal discharge elevator is more preferred for use with an agricultural harvester such as a combine, as it provides both the ability to lift the crop material, for instance, from adjacent the bottom of an on-board grain tank, and to change the direction of the movement while accelerating the material to a sufficient velocity for airborne movement over the end and transition portion of the belt and at least mostly onto the concave portion. For applications where suited, a conventional belt conveyor or other conveyor can be alternatively utilized, if configured to impart the required velocity in the required direction to the crop material.

As another preferred aspect of the invention, the system includes structure enclosing the upper end of the crop delivery apparatus and an upper portion of the intake end of the belt in tube conveyor, to provide a substantially continuous enclosed path for containing the airborne flow of the material over the transition portion of the conveyor belt and focusing the material into the crop receiving cavity and onto the concave portion of the belt, which will preferably about coincide about with the intake end of the conveyor tube. In this latter context, this structure will preferably shape or focus the flow of crop material from a wider conveyor or elevator, so as to correspond width-wise at least generally to the width of the concave portion of the belt, and height-wise so as to smoothly enter the crop receiving cavity bounded by the concave portion of the belt.

Operationally, the flow characteristics of the crop material achieved by the system of the invention are advantageous, as much of the material that contacts the belt or material previously deposited on the belt, will be traveling at least largely in the direction of belt movement, such that its propulsion energy, e.g., momentum, will be in that direction, so that it will readily feed onto the belt or existing material thereon and not require major redirection or dissipation of energy imparted by gravity and resulting downward velocity as would be the case if the material was gravity fed. Additionally, because the crop material is contacting the moving upstanding side portions of the belt instead of stationary walls or other enclosure, associated drag and further disruption or impedance of flow are avoided.

As another advantage, because the flow path of the material is preferably close to the belt and will be essentially parallel or near parallel to the feed direction, if it is still airborne as its propulsion energy is expended or about expended, it will fall only a small distance onto the belt or material on the belt and thus will not develop significant downward velocity from gravity. As a result, the material will be deposited on the belt with little disruptive effect and can be readily accelerated to the belt speed by contact with the belt or the existing material on the belt. In any event, because the material is propelled at least largely in the feed direction and relatively close to the belt or existing material thereon, it will not have to change direction in a significant manner, at least vertically, to then travel with and on the belt, which has been found to be a key aspect of achieving the fill capability sought. In this latter regard, as noted above, the system of the invention is configured and operable to allow the belt in tube conveyor to be pivoted or otherwise moved sidewardly at an angle to the crop delivery apparatus and thus the airborne flow of the crop material, while still providing the enhanced feed capability, largely as a result of the concave shape of the belt and its containing effect.

According to another preferred aspect of the invention, the upper portion of the intake end of the belt in tube conveyor or associated structure enclosing the flow path can comprise a tapered or frusto-conical shape that extends convergingly in the feed direction toward the main portion of the tube, so as to effectively function as the guide for containing the propelled crop material flow to largely the direction of belt movement, that is, parallel with or so as to intersect it at a small angle to parallel, and to contain the overall width of the flow to about that of the concave shaped portion of the belt. Preferably the length of the tapered or frusto-conical shaped upper portion of the tube or other enclosing structure will be about one to two times greater than a width of the conveyor tube, to provide a smooth flow shaping capability, particularly focusing, again, without significantly changing the direction of movement of the crop material or reducing its velocity.

As a non-limiting operational example, the belt in tube conveyor can have a belt speed of about 600 feet per minute, while the initial crop velocity can be less than half that speed, as long as it is adequate to propel the crop material over the transition portion of the belt and onto the concave portion. The airborne crop material, as it loses its velocity, will fall from the flow, but because it is moving in the feed direction and has momentum in that direction, will readily travel with and accelerate to the belt velocity by virtue of contact with the belt surface and/or other material on the belt. Thus, a high initial crop speed is not required to provide adequate fill and unloading capability for a typical combine harvester application.

DETAILED DESCRIPTION OF THE INVENTION

Figure 1:
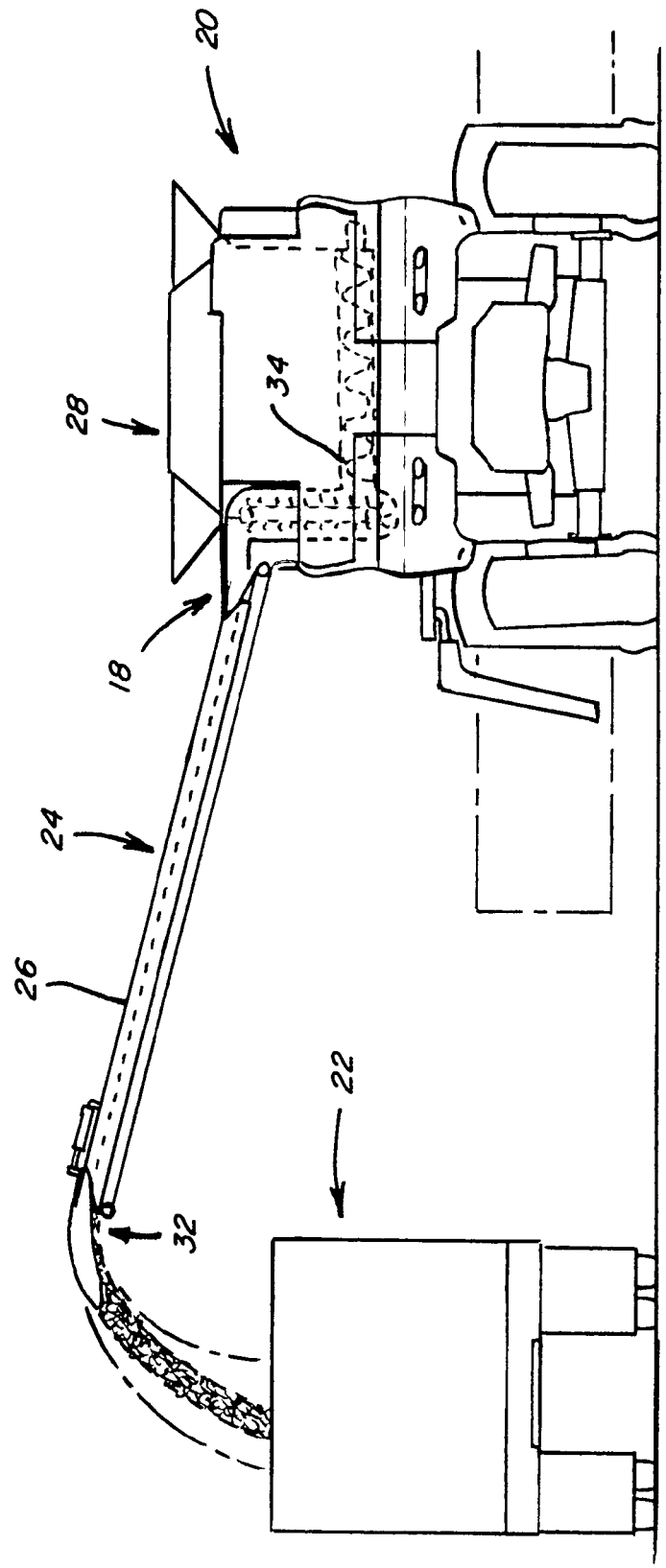
FIG. 1 is a rear view of a representative unloading operation in which a harvester delivers a flow of crop material, such as grain, to a receiving container, such as a grain truck, using an embodiment of the supercharging feed system and method of the invention.
Figure 3:
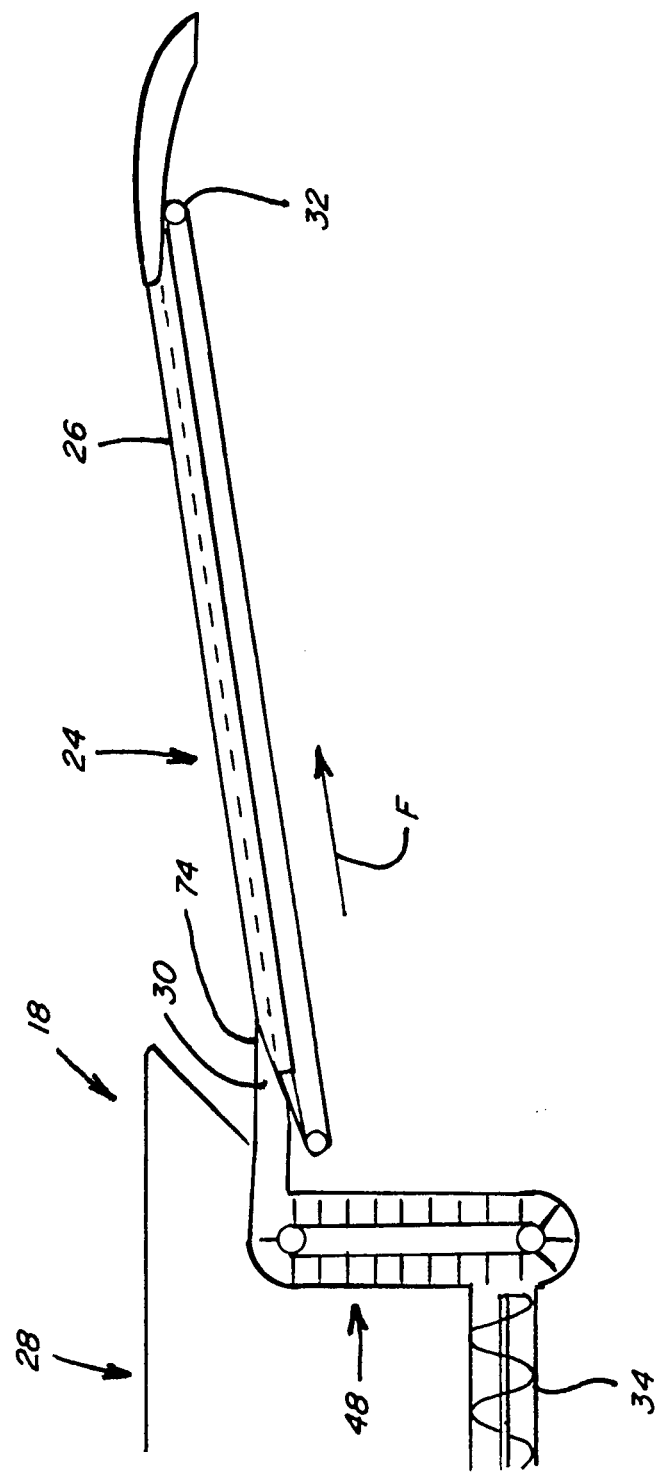
FIG. 3 is a simplified schematic front view of an embodiment of the supercharging feed system of the invention, in association with a belt in tube unloading conveyor system.
Figure 4:
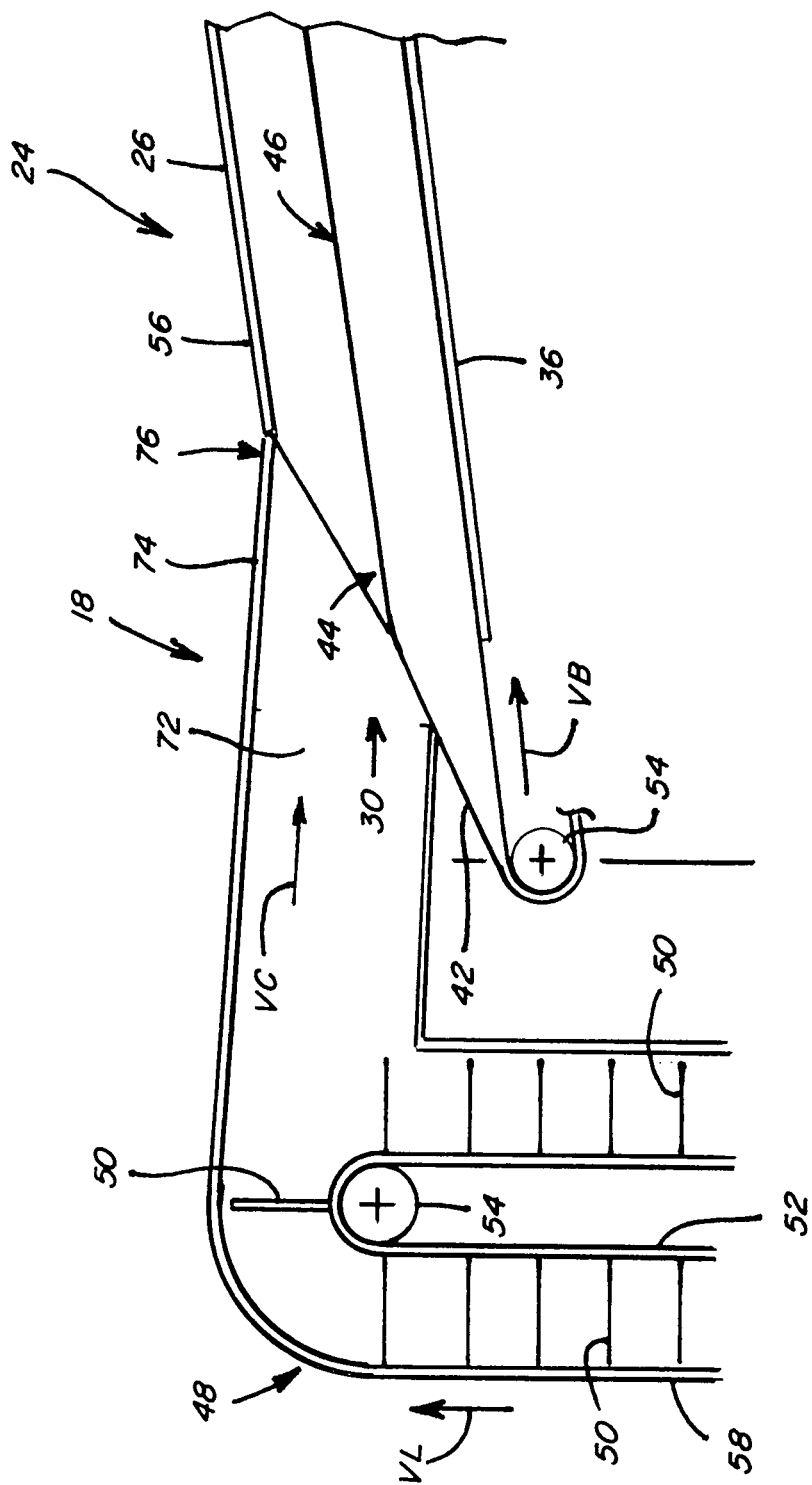
FIG. 4 is a fragmentary simplified schematic front view, showing aspects of the embodiment of the supercharging feed system of FIG. 3, and the intake end of the associated belt in tube unloading conveyor.

Referring now to the drawings, wherein like numbers refer to like items, FIG. 1 depicts a supercharging feed system 18 constructed and operable according to the teachings of the invention, incorporated onto a representative agricultural vehicle, which is shown here as a combine 20, in association with a belt in tube conveyor system 24 adapted for use as an unloading conveyor for combine 20. Belt in tube conveyor system 24 is shown in a deployed position extending sidewardly outwardly from combine 20, for unloading crop material from an on board grain tank 28 or other container, into an accompanying receiving container 22, such as a tractor pulled cart, wagon, trailer, or, in this case, a truck. As can be observed in FIG. 1, conveyor system 24 is advantageously inclined upwardly and outwardly relative to combine 20, to provide clearance for passage and placement over a variety of receiving containers, including when on side hills and other uneven or inclined surfaces and the like. Combine 20 includes a suitable transfer conveyor system 34 of conventional construction and operation, in connection with grain tank 28 for conveying the crop material therefrom in the well known manner, as also shown in FIG. 3.

Referring also to FIGS. 4-8, belt in tube conveyor system 24 includes a conveyor tube 26 having an open intake end 30 and an opposite open discharge end 32 defining a tubular passage therebetween. A lower portion 36 of tube 26 has an upwardly open curved concave shape. An endless belt conveyor with an upwardly facing feed surface 38 (FIGS. 7 and 8) includes a flat portion 42 adjacent to and outwardly of intake end 30, a concave portion 46 conforming to and in contact with the concave shape of lower portion 36 of conveyor tube 26, and a tapered transition portion 44 between the flat portion and the concave portion of the belt. Transition portion 44 refers to the portion of feed surface 38 that that changes or transitions in shape from flat to the upwardly open curved concave shape of lower portion 36 of the tubular passage as the belt enters intake end 30. Concave portion 46 has side portions that extend upwardly along side regions of tube 26, defining and bounding an upwardly facing, elongate crop receiving cavity 40 (FIGS. 6 and 8) that extends along the length of tube 26. A drive 54, which can comprise a conventional hydraulic or electric motor, belt, shaft, and/or chain drive, is located at one end of conveyor system 24 and is configured and operable to move the belt through the conveyor tube 26 at a belt velocity, represented by arrow VB, in a feed direction, represented by arrow F, from intake end 30 toward discharge end 32, in the well known manner. Alternate drive systems may be used to move the belt through conveyor tube 26. As a non-limiting example, an S drive on the return belt uses a back wrap around a powered roller to drive the top (feed) surface of the belt rather than the bottom surface of the belt using idlers to achieve the S drive. This drive system is useful because it takes advantage of the friction characteristics of the belt. The bottom of the belt has a low friction surface for easier movement through tube 26, and the top of the belt has more traction for holding grain as it moves through tube 26. Thus, the powered roller of the S drive is in contact with the higher friction (top) surface improving the efficiency of the drive system 54.

Supercharged feed system 18 of the invention includes a crop delivery apparatus 48 configured and operable to receive crop material from grain tank 28 or another source on combine 20, via operation of conveyor system 34 (FIGS. 1 and 3), and to propel the crop material at a crop velocity, represented by arrow VC, largely in, that is, at no more than a small acute angle to, feed direction F, toward intake end 30 and into crop receiving cavity 40, so as to be deposited at least largely onto the surface of concave portion 46 of the belt or previously deposited crop material on concave portion 46. Preferably, the crop material will be propelled at least initially in an airborne manner and at a sufficient crop velocity, so as to flow over flat portion 42 and transition portion 44 of the belt, to pass into crop receiving cavity 40 so as to be deposited on the surface of concave portion 46 or existing material thereon, without disrupting or impeding the flow of the material on the belt.

A preferred crop delivery apparatus 48 comprises a centrifugal discharge elevator, including paddle or bucket crop propellers 50 mounted at spaced locations along a drive belt 52, chains or the like. A drive 54, which can comprise a conventional hydraulic or electric motor, belt, shaft, and/or chain drive, is connected to one end of an upper roller of the elevator encircled by belt 52, and is configured and operable to drive belt 52 and propellers 50 carrying quantities of the crop material, denoted by arrows A in FIG. 6, from conveyor system 34 (FIGS. 1 and 3), upwardly at an initial lift velocity VL through a housing 58 of apparatus 48, and around the upper roller to accelerate the crop material, denoted by arrows B, to a required crop velocity as denoted by arrow VC using centrifugal force and resulting angular acceleration, to propel the crop material in feed direction F. As non-limiting representative examples, a crop velocity VC equal to two or three times lift velocity VL can be achieved, which will be sufficient to propel the crop material B in an airborne manner in a horizontal or slightly inclined direction relative to horizontal.

Figure 2:
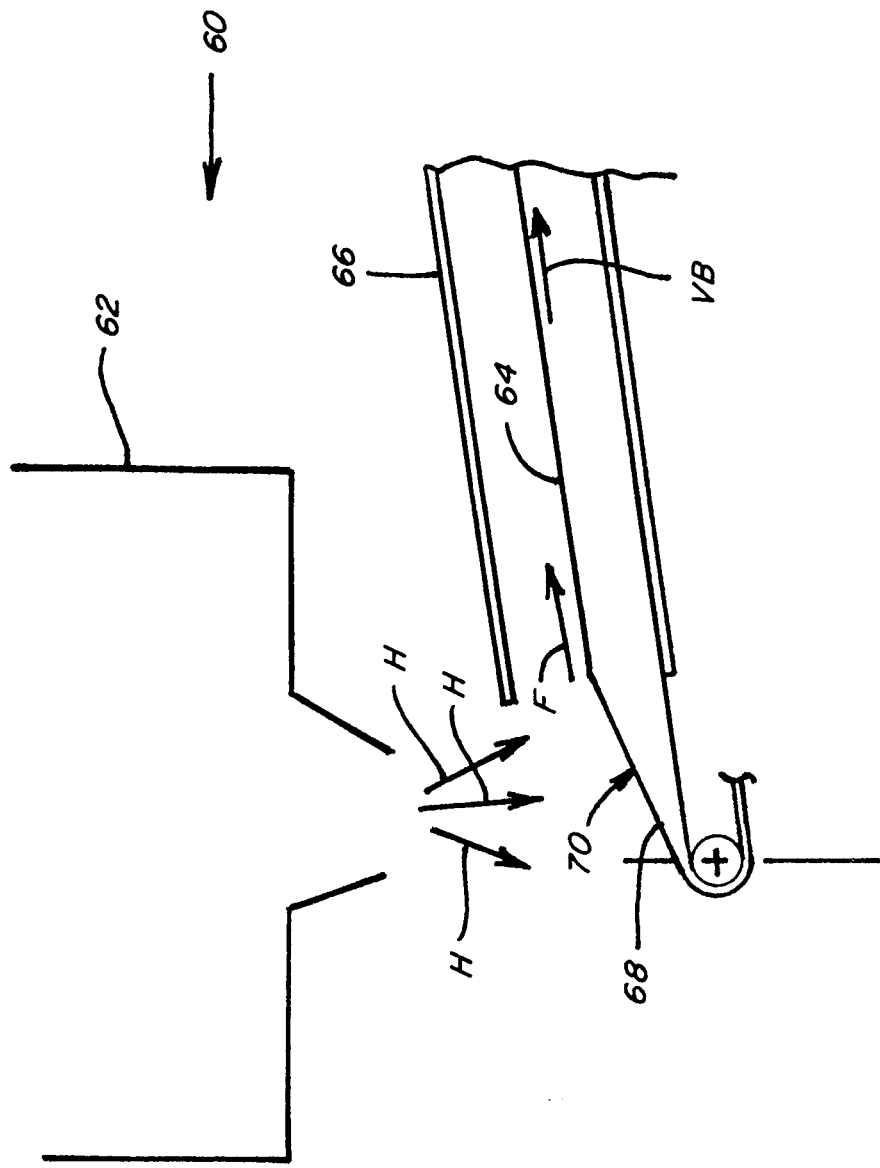
FIG. 2 is a side view of the intake end of a representative prior art belt in tube conveyor, showing a conventional prior art bin for feeding crop material thereto.

Referring also to FIG. 2, it should be understood that feeding crop material in a manner consistent with the system and method of the present invention enables advantageously utilizing the higher capacity and unloading speed of a belt in tube conveyor, compared with known prior art feed systems. FIG. 2 shows a representative prior art belt in tube conveyor system 60 in association with a typical prior art gravity feed system, which is a hopper 62 that feeds the material to the conveyor through a spout or other opening. Typically the crop material falls from hopper 62 or another suitable container onto a belt 64 at a flat portion 68 or a transition portion 70 thereof prior to or during its entry into a tube 66. As belt 64 transitions from the flat shape to the concave shape inside tube 66, material on the side regions of belt 64 will be shifted and lifted by the shaping of belt 64 into the concave shape, and deposited onto or displacing material already on the center region of belt 64, which can be disruptive to the smooth flow and passage of the material into the intake end of the conveyor.

Because the prior known systems use gravity feed, the material's propulsion energy is downward. It has additionally been observed that the flow of crop material falling from above, such as from a hopper 62, tends to naturally fan out somewhat as it falls under the force of gravity prior to reaching belt 64. This is illustrated by arrows H. Much of the crop material will also have velocity components in directions transverse to or opposite the feed direction F (which can be inclined upwardly), so that substantial directional change is required, both in terms of velocity and energy, e.g., momentum. Some of this energy will be overcome by the conveyor drive 54, and some will be dissipated through deflecting and bouncing of the particles of material, all of which can disrupt and impede the smooth flow and passage of the material into the intake end of the conveyor, to reduce fill.

Figure 8:
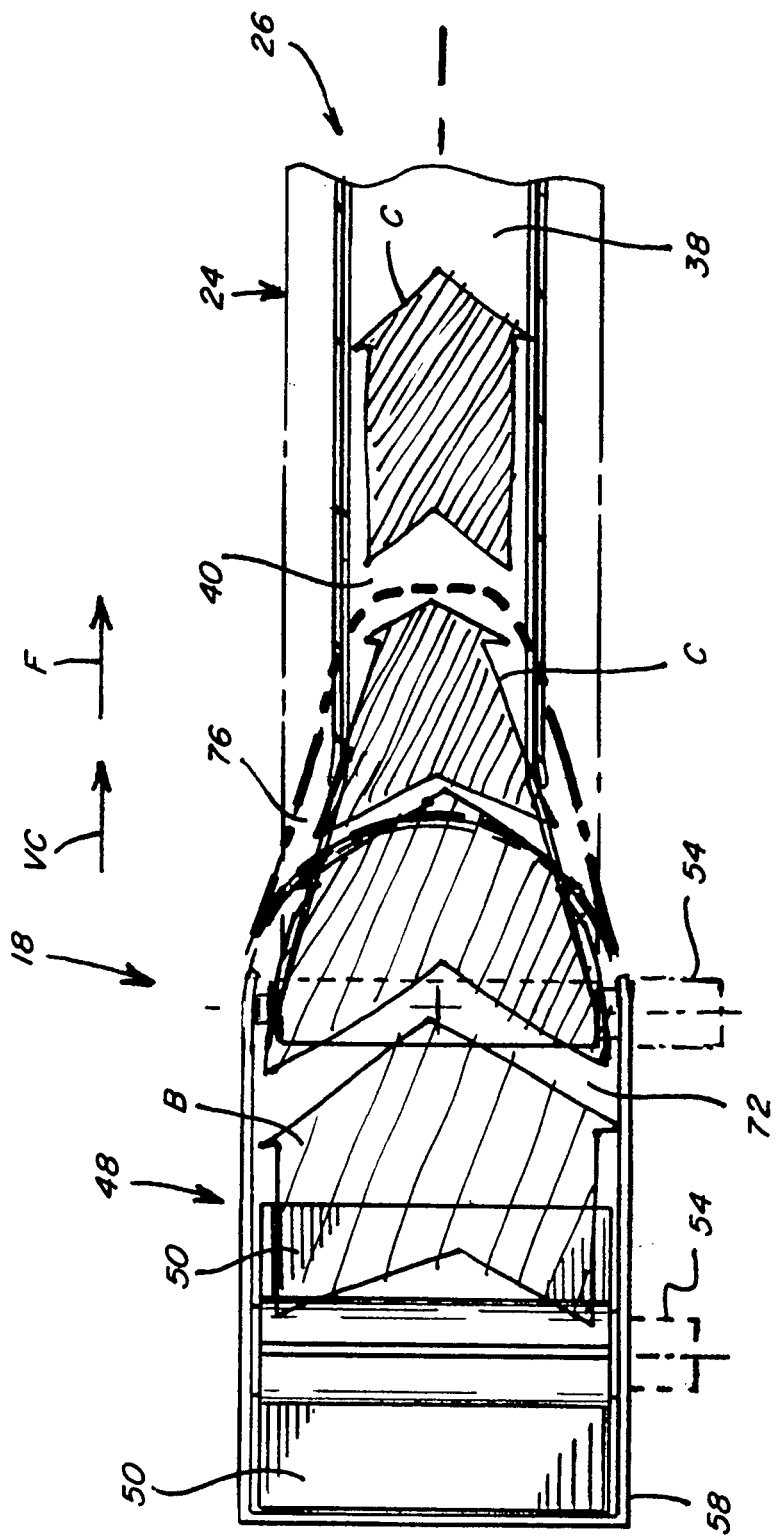
FIG. 8 is a top sectional view of a portion of an embodiment of the supercharging feed system of the invention and an associated belt in tube conveyor, illustrating with arrows crop material delivery to the belt in tube conveyor.

In contrast, as illustrated also in FIG. 8, supercharging system 18 and the method of operation of the present invention will enable increased fill capacity and unloading capability of belt in tube conveyor system 24, by propelling the crop material at crop velocity VC substantially or at least largely in feed direction F, and by delivering at least a substantial portion of the crop material into crop receiving cavity 40 and onto concave portion 46 of the belt, with minimal crop material deposited on transition portion 44, as denoted by arrows C, such that the above discussed problems and shortcomings, namely, shifting and disruption of material flow, direction change, and dissipation of energy by the conveyor, are largely reduced or avoided.

An upper portion 56 of conveyor tube 26 preferably includes a portion 76 having a frusto-conical, tapered, or other converging shape encompassing or adjacent to intake end 30 and near transition portion 44. The direction of convergence is in feed direction F, such that upper portion 56 essentially acts to contain and focus the flow of propelled crop material from crop delivery apparatus 48 (which here is wider) into cavity 40 and onto concave portion 46. In particular, upper portion 56 will preferably shape or focus the flow of crop material so as to correspond width-wise at least generally to the width of concave portion 46, and height-wise so as to smoothly enter intake end 30.

System 18 additionally preferably includes an enclosure 74 extending substantially between crop delivery apparatus 48 and concave portion 46, defining and enclosing a flow path 72 for the crop material to intake end 30 of the conveyor tube, as a non-limiting example, configured as an extension of housing 58 of crop delivery apparatus 48, and configured in mating relation, e.g., overlapping or underlapping relation, to converging portion 76 of upper portion 56 of conveyor tube 26, to cooperate with crop delivery apparatus 48 to contain and direct the propelled crop material over transition portion 44 of the belt and toward the intake end. In addition, enclosure 74 and upper portion 56 shield the crop material from the elements, particularly in the presence of winds that could change the direction of the flow.

Figure 7:
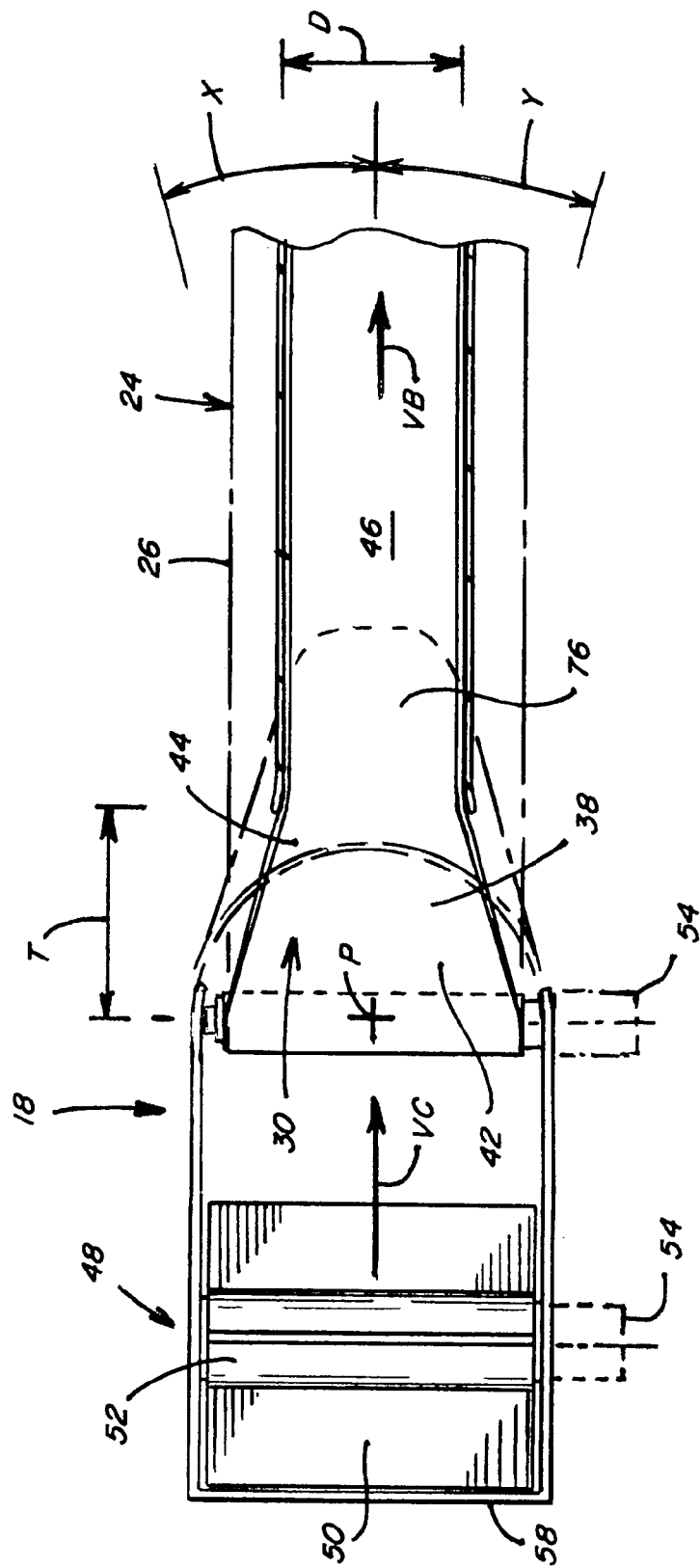
FIG. 7 is a top view of aspects of the supercharging feed system and of the associated belt in tube conveyor.

In order to maintain a more even fill level in the receiving container 22 or truck, an additional preferred feature of system 18 is the ability of conveyor tube 26 to pivot sidewardly relative to combine 20, preferably about a point P near intake end 30, for directing discharge end 32 over the receiving container 22 at more forward or rearward positions as denoted by arrows X and Y (FIG. 7). As non-limiting representative ranges of pivoting movement, each of arrows X and Y can represent about 15 degrees or so. It should be noted, however, that advantageously, even with conveyor tube 26 pivoted by a maximum amount in either direction, crop material will still be directed largely in feed direction F and deposited on concave portion 46 of feed surface 38 of the belt, as a result of the converging tapered shape of upper portion 56 and enclosure 74 focusing the crop flow, and the close proximity of intake end 30 to point P.

Figure 5:
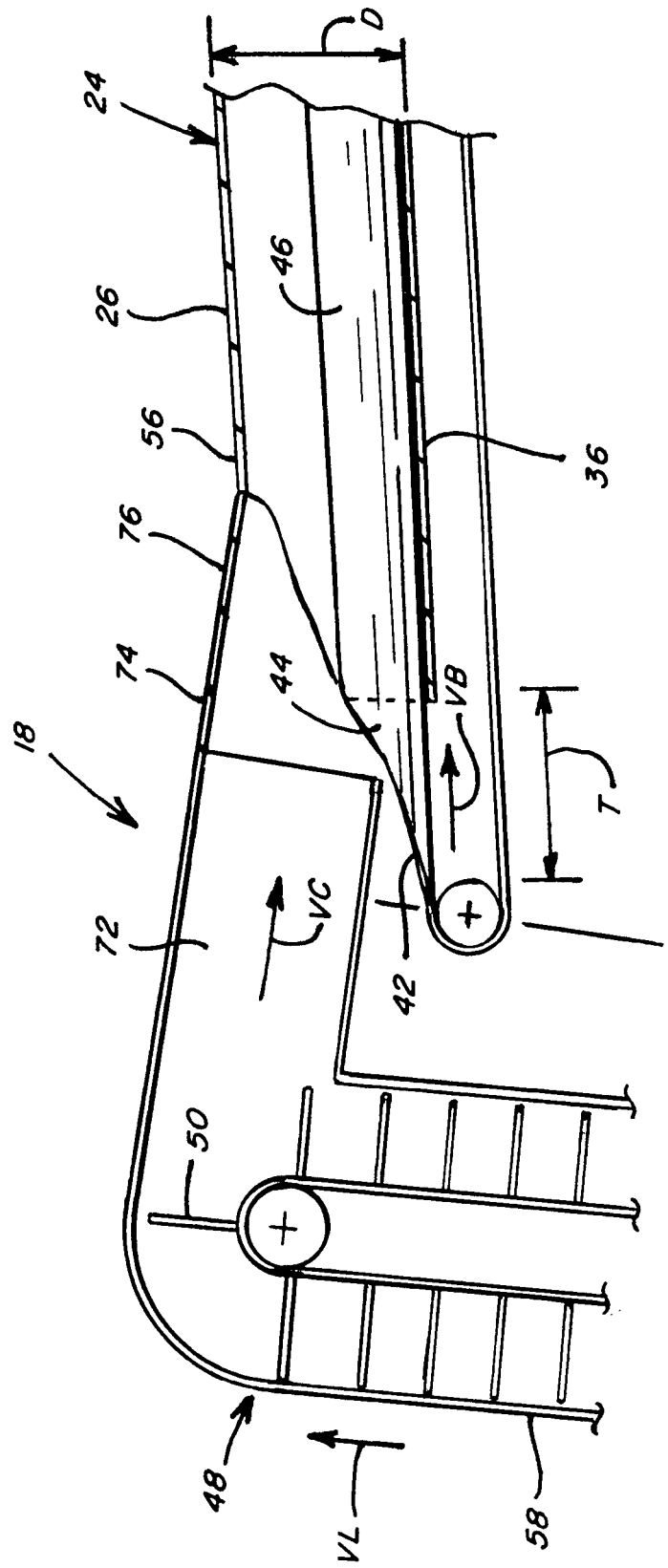
FIG. 5 is another fragmentary simplified schematic front view showing aspects of the supercharging feed system of FIGS. 3 and 4, and aspects of the belt in tube conveyor.
Figure 6:
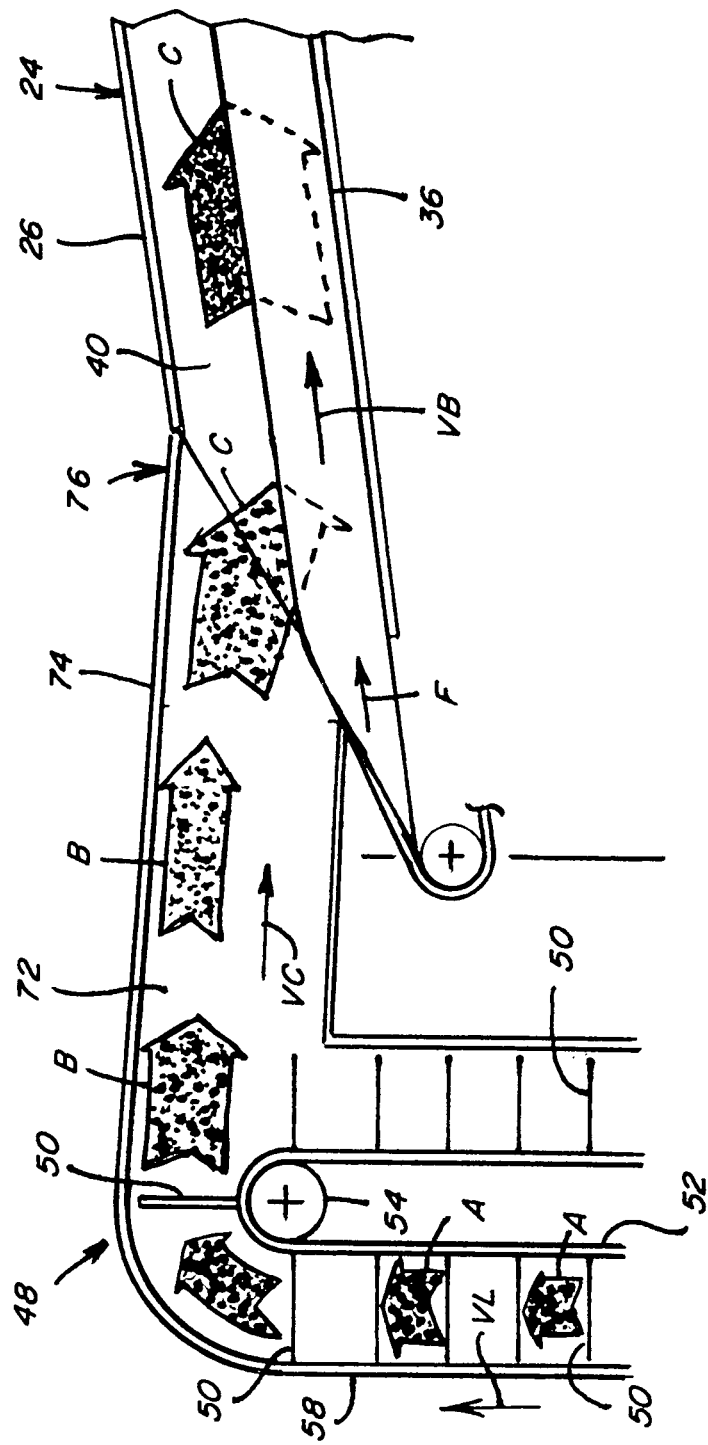
FIG. 6 is still another fragmentary simplified schematic front view of the supercharging feed system, using arrows to show operational aspects thereof according to the invention and of the associated belt in tube conveyor, namely, a manner of crop material delivery to the belt in tube conveyor.

As an additional capability of system 18 of the invention, it is operable to provide desired fill levels with the associated belt in tube conveyor oriented in a relatively wide range of inclines, generally up to about the angle of repose of the material being conveyed (angle at which the grain will slide down a slope), which in the case of many agricultural grains, is about 28 degrees or so. In the present embodiment, conveyor system 24 in the deployed or unloading position is illustrated inclined upwardly by less than that amount when combine 20 is on a level surface, which will accommodate operation at an additional upward side tilt for operation on hillsides and the like, without the angle of repose of the grain reducing feed capability significantly. In this orientation, feed direction F is inclined upwardly toward discharge end 32. It can be observed that upper portion 56 of conveyor tube 26 and associated enclosure 74 are about horizontal, or possibly inclined downwardly a slight amount. As a result, the direction of the crop material flow as denoted by arrows B and C is horizontal or slightly downwardly at a small angle to horizontal, e.g., of for instance 10 degrees or less, relative to the upwardly inclined feed direction F, which demonstrates values within a larger range of relative angular relationships between feed system 18 and conveyor system 24 of which the term "largely" is deemed inclusive. To further illustrate the possible operational angles of the system of the invention, FIG. 5 illustrates feed system 18 and conveyor system 24 as they would be on a downward side slope of a hillside, e.g., downwardly inclined and generally horizontal, respectively, with continued operability. As a result, it should be understood that the system provides versatility for use at a wide variety of operational angles between the flow of crop material and the belt in tube conveyor.

Advantages of the system and method disclosed for supercharging the feed to the belt in tube conveyor of the present invention include the capability to achieve full or near full fill levels at high conveyor belt speeds but relatively slower crop delivery speeds, and with less grain damage than conventional helical augers.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A belt in tube conveyor system, comprising:
a conveyor tube having an open intake end in connection with a passage through the tube, and a lower portion bounding a lower periphery of the intake end and the passage, having an upwardly facing concave shape;
an endless belt having a concave portion extending into the passage through the intake end, supported on the lower portion of the tube, and a transition portion outwardly of the intake end wherein the belt transitions from a flat shape to the upwardly facing concave shape of the lower portion of the tube, the transition portion disposed between a crop delivery apparatus and the concave portion;
a drive configured and Operable to move the belt at a feed velocity and in a feed direction through the intake end into the passage; and
the crop delivery apparatus configured and positioned to propel a flow of crop material at a crop velocity vector at least a majority of which is in the feed direction onto the concave portion of the belt or crop material previously deposited on the concave portion in a generally horizontal direction over the transition portion, as the belt is moved at the feed velocity in the feed direction.

2. The system of claim 1, wherein the crop delivery apparatus is configured and operable to propel at least some of the crop material in an airborne manner over the transition portion of the belt, onto the concave portion thereof.

3. The system of claim 1, wherein the crop delivery apparatus is configured and operable to propel at least some: the crop material in an airborne manner through the intake end of the tube into an upwardly facing crop receiving cavity bounded by the concave portion of the belt.

4. The system of claim 1, further comprising a structure defining and enclosing a flow path for flow of the propelled crop material between the crop delivery apparatus and the intake end, and wherein the intake end has a generally converging shape configured to focus the flow of the propelled crop material onto the concave portion of the belt.

5. The system of claim 1, wherein the conveyor tube extends upwardly from the intake end to a discharge end at an acute angle relative to horizontal such that the concave portion of the belt is similarly inclined, and the crop delivery apparatus is configured and operable to propel the crop material airborne generally horizontally over the transition portion of the belt onto the concave portion.

6. The system of claim 1, further comprising a structure defining and enclosing a flow path for flow of the propelled crop material between the crop delivery apparatus and the intake end, wherein the structure comprises a tapered or frusto-conical shape converges in the feed direction.

7. The system of claim 6, wherein the conveyor tube is pivotable about a point near the intake end.

8. The system of claim 1, wherein the crop delivery apparatus comprises a centrifugal discharge elevator, configured and operable to lift and accelerate the crop material, and propel the crop material generally horizontally, at least partially into the intake end of the conveyor tube.

9. The system of claim 8, wherein the centrifugal discharge elevator is disposed on an agricultural vehicle in connection with a grain tank thereof, for receiving the crop material from the grain tank, and the conveyor tube is configured to extend outwardly from the vehicle.

10. A belt in tube conveyor system, comprising:
a conveyor tube having an open intake end in connection with a passage through the tube, and a lower portion bounding a lower periphery of the intake end and the passage, having an upwardly facing concave shape;
an endless belt having a concave portion extending into the passage through the intake end, supported on the lower portion of the tube, and a transition portion outwardly of the intake end wherein the belt transitions from a flat shape to the upwardly facing concave shape of the lower portion of the tube;
a drive configured and operable to move the belt at a feed velocity and in a feed direction through the intake end into the passage; and
a crop delivery apparatus configured and operable to propel a flow of crop material at a crop velocity at least largely in the feed direction onto the concave portion of the belt or crop material previously deposited oh the concave portion, as the belt is moved at the feed velocity in the feed direction; and
wherein the transition portion has a length about equal to one to two times a width of the conveyor tube.

11. A supercharged: belt in tube conveyor system on an agricultural vehicle for unloading a grain tank thereof, comprising:
a conveyor tube having an open intake end in connection with a passage through the tube, and a lower portion bounding a lower periphery of the intake end and the passage, having an upwardly facing concave shape;
an endless belt having a concave :portion extending into the passage through the intake end and supported on the lower portion of the tube, defining an upwardly open crop receiving cavity within the passage; and
a feed system comprising a crop delivery apparatus configured to receive crop material from the grain tank and accelerate and propel a flow of the crop material through an outlet in an airborne manner in the feed direction wherein at least a majority of a directional vector of the crop material is in the horizontal direction into the crop receiving cavity and onto the concave portion of the belt or crop material previously deposited on the concave portion; and
wherein a structure defines and encloses a flow path for flow of the propelled crop material from the crop delivery apparatus wherein the structure has a generally vertically aligned crop discharge opening toward the intake end and the intake end of the tube has a generally narrowing and downward tapered shape converging to focus the flow of the propelled crop material onto the concave portion of the belt.

12. The system of claim 11, wherein the belt additionally comprises a transition portion which transitions the belt from a flat shape to the upwardly facing concave shape, disposed between the crop delivery apparatus and the concave portion, and the crop delivery apparatus is configured to propel the crop material in the airborne manner over the transition portion.

13. The system of claim 11, wherein the crop delivery apparatus comprises a centrifugal discharge elevator, configured and operable to lift and accelerate the crop material, and propel the crop material generally horizontally in the feed direction.

14. The system of claim 11, wherein the conveyor is pivotable sidewardly relative to the crop delivery apparatus.

15. A method of supercharging a belt in tube conveyor system on an agricultural vehicle for unloading a grain tank thereof, comprising steps of:

providing a conveyor tube having an open intake end in connection with a passage through the tube, and a lower portion bounding a lower periphery of the intake end and the passage, having an upwardly facing concave shape;

providing an endless belt having a concave portion extending into the passage through the intake end and supported on the lower portion of the tube, defining an upwardly open crop receiving cavity within the passage, and a drive for moving the belt into the intake end and through the passage;

providing a feed system comprising a crop delivery apparatus configured to receive crop material from the grain tank and propel a flow of the crop material in an airborne manner therefrom onto the belt; and operating the feed system during the movement of the belt, to propel the flow of the crop material in a feed direction of the belt at least largely into the crop receiving cavity and onto the concave portion of the belt or crop material previously deposited on the concave portion; and wherein the belt additionally comprises a transition portion which transitions the belt from a flat shape to the upwardly facing concave shape, disposed between the crop delivery apparatus and the concave portion, and the step of propelling the flow of the crop material comprises propelling the crop material in the airborne manner in a generally horizontal direction over the transition portion.

16. The method of claim 15, wherein the transition portion has a length about equal to one to two times a width of the conveyor tube.

17. The method of claim 15, wherein the step of propelling the flow of the crop material over the transition portion comprises propelling the crop material generally horizontally from the feed system.

18. The method of claim 15, wherein the crop delivery apparatus comprises a centrifugal discharge elevator.

* * * * *